(12) United States Patent
Liang et al.

(10) Patent No.: US 12,358,539 B2
(45) Date of Patent: Jul. 15, 2025

(54) LINEAR MOTOR FOR MAGLEV TRAIN, AND MAGLEV TRAIN

(71) Applicant: CRRC QINGDAO SIFANG CO., LTD., Shandong (CN)

(72) Inventors: Jianying Liang, Shandong (CN); Xiankai Liu, Shandong (CN); Donghua Wu, Shandong (CN); Weitao Han, Shandong (CN); Jin Luan, Shandong (CN); Fujie Jiang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 783 days.

(21) Appl. No.: 17/763,656

(22) PCT Filed: Jan. 26, 2021

(86) PCT No.: PCT/CN2021/073746
§ 371 (c)(1),
(2) Date: Mar. 25, 2022

(87) PCT Pub. No.: WO2021/179816
PCT Pub. Date: Sep. 16, 2021

(65) Prior Publication Data
US 2022/0340178 A1     Oct. 27, 2022

(30) Foreign Application Priority Data
Mar. 11, 2020  (CN) .......................... 202010168652.1

(51) Int. Cl.
*B61B 13/08* (2006.01)
*H01F 7/02* (2006.01)
(Continued)

(52) U.S. Cl.
CPC ........... *B61B 13/08* (2013.01); *H01F 7/0236* (2013.01); *H01F 7/0247* (2013.01); *H02K 1/04* (2013.01);
(Continued)

(58) Field of Classification Search
CPC .......... H02K 1/04; H02K 41/02; H02K 41/03; H02K 41/031; H02K 2213/03;
(Continued)

(56) References Cited

U.S. PATENT DOCUMENTS 3,735,231 A * 5/1973 Sawyer ................ G05B 19/253
310/12.05
5,868,077 A * 2/1999 Kuznetsov .............. B60L 13/08
104/285
(Continued)

FOREIGN PATENT DOCUMENTS

CN     101888164 A  * 11/2010
CN     104319976 A  *  1/2015
(Continued)

OTHER PUBLICATIONS

International Search Report for PCT/CN2021/073746 mailed Apr. 25, 2021, ISA/CN.
(Continued)

*Primary Examiner* — S. Joseph Morano
*Assistant Examiner* — Cheng Lin
(74) *Attorney, Agent, or Firm* — Yue (Robert) Xu; Apex Attorneys at Law, LLP

(57) ABSTRACT

A linear motor comprises a primary part and a secondary part opposite to each other. An air gap is reserved between the primary and secondary parts. The air gap has first spacing in non-operating state and second spacing in operating state. The side surface of the primary part facing the secondary part is provided with a magnetically conductive
(Continued)

film that has elasticity in the thickness direction and a thickness greater than the first spacing and less than the second spacing. The magnetically conductive film comprises magnetically conductive base bodies and non-magnetically conductive base bodies alternately distributed along the surface of the magnetically conductive film, and the magnetically conductive base bodies are filled with magnetically conductive materials. The magnetically conductive base bodies cover magnetic poles on the side surface of the primary part facing the secondary part, and the non-magnetically conductive base bodies shield gaps between the adjacent magnetic poles.

14 Claims, 2 Drawing Sheets

(51) Int. Cl.
H02K 1/04 (2006.01)
H02K 41/02 (2006.01)
H02K 41/03 (2006.01)
H02N 15/00 (2006.01)

(52) U.S. Cl.
CPC .............. *H02K 41/02* (2013.01); *H02K 41/03* (2013.01); *H02K 41/031* (2013.01); *H02N 15/00* (2013.01); *H02K 2201/03* (2013.01); *H02K 2213/03* (2013.01)

(58) Field of Classification Search
CPC ... H02K 2201/03; B61B 13/08; H01F 7/0236; H01F 7/0247; H02N 15/00
See application file for complete search history.

(56) References Cited

U.S. PATENT DOCUMENTS

| 7,057,312 | B2 | | 6/2006 | Hodzic et al. |
| 7,723,888 | B2 | * | 5/2010 | Petek ................... H02K 29/03 |
| | | | | 310/112 |
| 10,407,246 | B2 | * | 9/2019 | Reinthaler ............. H02K 1/148 |
| 10,965,224 | B2 | * | 3/2021 | Piitulainen .......... B66B 11/0407 |
| 11,346,059 | B2 | * | 5/2022 | Radziszewski ....... E04B 1/3205 |
| 2005/0195381 | A1 | * | 9/2005 | Cuijpers .............. H02K 41/031 |
| | | | | 355/75 |
| 2016/0067855 | A1 | | 3/2016 | Grygorczuk et al. |

FOREIGN PATENT DOCUMENTS

| CN | 108258877 A | * | 7/2018 | ......... G06F 17/5018 |
| CN | 108736592 A | | 11/2018 | |
| CN | 109245483 A | * | 1/2019 | ............ H02K 41/02 |
| CN | 109617359 A | | 4/2019 | |
| CN | 111277109 A | | 6/2020 | |
| EP | 0897449 B1 | | 1/2002 | |
| JP | 2010283967 A | * | 12/2010 | |

OTHER PUBLICATIONS

Han Yongchun, Study on the Relationship Between the linear Motor of Air Gap and the Energy Consumption of Train, Railway Locomotive & Car, vol. 35, No. 6, Dec. 25, 2015, ISSN:1008-7842, pp. 69-72.
First Office Action dated Jan. 30, 2024 for Korean patent application No. 10-2022-7017499, English translation provided by Global Dossier.
Search Report dated Feb. 7, 2024 for European patent application No. 21768242.6.

* cited by examiner

LINEAR MOTOR FOR MAGLEV TRAIN, AND MAGLEV TRAIN

The present application is the national phase of International Application No. PCT/CN2021/073746, titled "LINEAR MOTOR FOR MAGLEV TRAIN, AND MAGLEV TRAIN", filed on Jan. 26, 2021, which claims priority to Chinese Patent Application No. 202010168652.1, titled "LINEAR MOTOR FOR MAGLEV TRAIN, AND MAGLEV TRAIN", filed on Mar. 11, 2020 with the China National Intellectual Property Administration, which is incorporated herein by reference in its entirety.

FIELD

The present disclosure relates to the technical field of maglev trains, and in particular, to a linear motor of a maglev train and a maglev train.

BACKGROUND

Operation states of an attractive maglev train, such as traction, braking, forward running, reverse running, and so on, are realized by a linear motor and a converter system. A linear induction motor (LIM) is applied to a maglev trains currently, which directly determines the operating performance of the maglev train. A distance between a stator and a rotor of the linear motor is called an air gap, and the value of the air gap during working is a key parameter that affects the force of the linear motor.

Due to the construction error of the railway line and the structure of the maglev train, the actual air gap of the maglev train during working is large, and the large air gap is a main reason for large power consumption and low efficiency of the linear motor. Therefore, reducing the air gap of the linear motor of the maglev train during working is an effective means to improve the driving efficiency of the train system. However, since the railway line is not ideally smooth, and the primary and secondary of the linear motor are rigid bodies and cannot be impacted, the designed air gap during working is relatively large. Therefore, it is a problem to be solved urgently by those skilled in the art to improve the driving efficiency of the train system while protecting the linear motor from being damaged.

SUMMARY

A purpose of the present disclosure is to provide a linear motor of a maglev train, to improve the driving efficiency of the entire train system while protecting the linear motor from being damaged. The present disclosure also provides a maglev train, which can improve the driving efficiency of the entire train system while protecting the linear motor from being damaged.

To achieve the above objective, a linear motor of a maglev train is provided according to the disclosure, including a primary and a secondary that are arranged oppositely. An air gap is provided between the primary and the secondary. The air gap has a first distance in a non-working state, and has a second distance in a working state.

A permeability magnetic film is provided on a surface of the primary facing the secondary, and the permeability magnetic film is elastic in a thickness direction, and a thickness of the permeability magnetic film is greater than the first distance and is smaller than the second distance.

The permeability magnetic film includes a permeability magnetic substrate and a non-permeability magnetic substrate that are alternately distributed along a surface of the permeability magnetic film, and the permeability magnetic substrate is filled with a permeability magnetic film material; the permeability magnetic substrate covers a magnetic pole of the surface of the primary facing the secondary, and the non-permeability magnetic substrate covers a gap between adjacent magnetic poles.

Optionally, the permeability magnetic film is rigid in a direction parallel to a surface of the permeability magnetic film.

Optionally, a surface of the non-permeability magnetic substrate facing the primary is higher than a surface of the permeability magnetic substrate facing the primary.

Optionally, a surface of the non-permeability magnetic substrate facing the secondary has the same height as a surface of the permeability magnetic substrate facing the secondary.

Optionally, the surface of the non-permeability magnetic substrate facing the primary is higher than the surface of the permeability magnetic substrate facing the primary by a height in a range of 1.5 mm to 2.5 mm, including marginal values.

Optionally, a thickness of the permeability magnetic substrate ranges from 7 mm to 8 mm, including marginal values.

Optionally, the permeability magnetic film material includes a granular iron material or a threadiness iron material.

A maglev train is further provided by the disclosure, including the linear motor of a maglev train described above.

The linear motor of a maglev train provided according to embodiments of the present disclosure includes a primary and a secondary that are arranged oppositely, and an air gap is provided between the primary and the secondary; where the air gap has a first distance in a non-working state, and has a second distance in a working state; a permeability magnetic film is provided on a surface of the primary facing the secondary, and the permeability magnetic film is elastic in a thickness direction, and a thickness of the permeability magnetic film is greater than the first distance and is smaller than the second distance; the permeability magnetic film includes a permeability magnetic substrate and a non-permeability magnetic substrate that are alternately distributed along a surface of the permeability magnetic film, and the permeability magnetic substrate is filled with a permeability magnetic film material; the permeability magnetic substrate covers a magnetic pole of the surface of the primary facing the secondary, and the non-permeability magnetic substrate covers a gap between adjacent magnetic poles.

During working, the magnetic pole on the surface of the primary facing the secondary is covered with the permeability magnetic substrate, and the gap between the magnetic poles is shielded by the non-permeability magnetic substrate. The magnetic field generated by the magnetic poles will be transmitted to the secondary through the permeability magnetic substrate and the air gap in turn. The permeability magnetic substrate has a certain thickness, which can reduce the distance of the air gap, thereby reducing the power consumption of the linear motor, improving the efficiency of the linear motor, and thereby improving the driving efficiency of the entire train system. The permeability magnetic film is elastic in the thickness direction, thereby avoiding a direct collision between the primary and the secondary during stopping, and protecting the linear motor from damage.

A maglev train is also provided according to the present disclosure, and the maglev train also has the beneficial effect described above, which will not be described again herein.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrate some embodiments of the present disclosure; other drawings may be obtained by those ordinarily skilled in the art based on these drawings without any creative efforts.

REFERENCE NUMERALS

Figure 1:
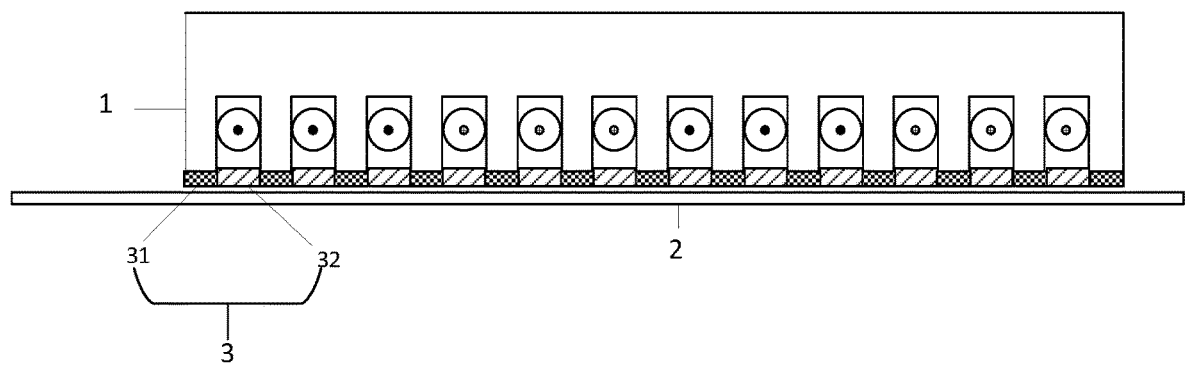
FIG. 1 is a schematic structural diagram of a linear motor of a maglev train according to an embodiment of the present disclosure.

1—Primary 2—Secondary 3—Permeability magnetic film
31—Permeability magnetic substrate 32—Non-permeability magnetic substrate

DETAILED DESCRIPTION

The present disclosure aims to provide a linear motor of a maglev train. Conventionally, due to the construction error of the railway line and the structure of the maglev train, the actual air gap of the maglev train during working is large, and the large air gap is a main reason for the large power consumption and low efficiency of the linear motor.

A linear motor of a maglev train is provided according to embodiments of the present disclosure. The linear motor of a maglev train includes a primary and a secondary that are arranged oppositely, and an air gap is provided between the primary and the secondary; where the air gap has a first distance in a non-working state, and has a second distance in a working state; a permeability magnetic film is provided on a surface of the primary facing the secondary, and the permeability magnetic film is elastic in a thickness direction, and a thickness of the permeability magnetic film is greater than the first distance and is smaller than the second distance; the permeability magnetic film includes a permeability magnetic substrate and a non-permeability magnetic substrate that are alternately distributed along a surface of the permeability magnetic film, and the permeability magnetic substrate is filled with a permeability magnetic film material; the permeability magnetic substrate covers a magnetic pole of the surface of the primary facing the secondary, and the non-permeability magnetic substrate covers a gap between adjacent magnetic poles.

During working, the magnetic pole on the surface of the primary facing the secondary is covered with the permeability magnetic substrate, and the gap between the magnetic poles is shielded by the non-permeability magnetic substrate. The magnetic field generated by the magnetic poles will be transmitted to the secondary through the permeability magnetic substrate and the air gap in turn. The permeability magnetic substrate has a certain thickness, which can reduce the distance of the air gap, thereby reducing the power consumption of the linear motor, improving the efficiency of the linear motor, and thereby improving the driving efficiency of the entire train system. The permeability magnetic film is elastic in the thickness direction, thereby avoiding a direct collision between the primary and the secondary during stopping, and protecting the linear motor from damage.

In order to make those skilled in the art understand the technical solutions of the present disclosure better, the present invention will be described in detail below in conjunction with embodiments and drawings. Apparently, the described embodiments are only a part of the embodiments of the present disclosure, rather than all embodiments. Based on the embodiments in the present disclosure, all of other embodiments, made by the person skilled in the art without any creative efforts, fall into the scope of protection of the present disclosure.

Figure 2:
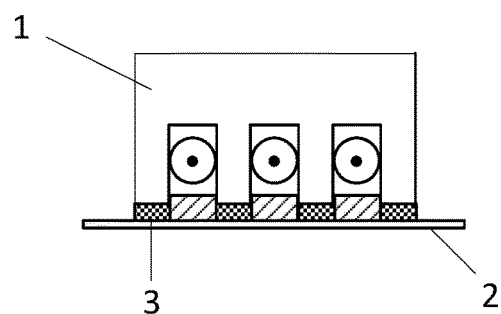
FIG. 2 is a schematic structural diagram of a linear motor of a maglev train in a static state according to an embodiment of the present disclosure.
Figure 3:
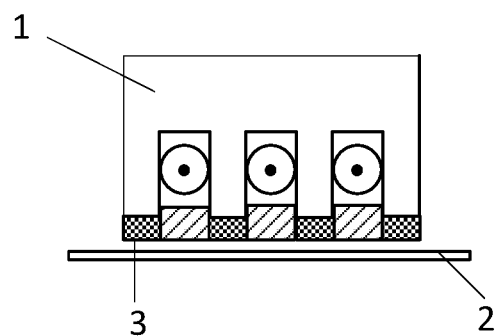
FIG. 3 is a schematic structural diagram of a linear motor of a maglev train in a working state according to an embodiment of the present disclosure.

Referring to FIGS. 1 to 3, FIG. 1 is a schematic structural diagram of a linear motor of a maglev train according to an embodiment of the present disclosure, FIG. 2 is a schematic structural diagram of a linear motor of a maglev train in a static state, and FIG. 3 is a schematic structural diagram of a linear motor of a maglev train in a working state.

Referring to FIG. 1, a linear motor of a maglev train in this embodiment includes a primary 1 and a secondary 2 that are arranged oppositely, and an air gap is provided between the primary 1 and the secondary 2. The air gap has a first distance in a non-working state, and has a second distance in a working state. A permeability magnetic film 3 is provided on a surface of the primary 1 facing the secondary 2, and the permeability magnetic film 3 is elastic in a thickness direction, and a thickness of the permeability magnetic film 3 is greater than the first distance and is smaller than the second distance. The permeability magnetic film 3 includes a permeability magnetic substrate 31 and a non-permeability magnetic substrate 32 that are alternately distributed along a surface of the permeability magnetic film 3, and the permeability magnetic substrate 31 is filled with a permeability magnetic film material. The permeability magnetic substrate 31 covers a magnetic pole of the surface of the primary 1 facing the secondary 2, and the non-permeability magnetic substrate 32 covers a gap between adjacent magnetic poles.

The above-mentioned primary 1 is a stator in the linear motor, and the secondary 2 is a rotor in the linear motor. The linear motor provided according to the embodiment of the present disclosure usually adopts a short stator structure. The surface of the primary 1 facing the secondary 2 is usually provided with a slot, and windings are provided in the slot. A protrusion between adjacent slots is functioned as a magnetic pole, and there is a gap between adjacent magnetic poles and the gap is the slot. There is an air gap between the primary 1 and the secondary 2. There is a first distance with a relatively small value between the primary 1 and the secondary 2 when the linear motor is in a non-working state; and there is a second distance with a larger value between the primary 1 and the secondary 2 when the linear motor is in a working state. Generally, in the non-working state, the first distance of the air gap is usually about 5 mm; and in the working state, the second distance of the air gap is usually about 13 mm. Specific materials of the primary 1 and the secondary 2 may be referred to the prior art, which will not be described herein.

Referring to FIG. 2 and FIG. 3, a permeability magnetic film 3 is provided on a surface of the primary 1 facing the secondary 2, and the permeability magnetic film 3 is elastic in a thickness direction. The thickness direction of the permeability magnetic film 3 is the direction along the distance between the primary 1 and the secondary 2. The permeability magnetic film 3 is elastic in the thickness direction, which means that the primary 1 and the secondary 2 can compress the permeability magnetic film 3. When the air gap between the primary 1 and the secondary 2 becomes larger, the thickness of the permeability magnetic film 3 will recover to an original state. In the embodiment of the present disclosure, the thickness of the permeability magnetic film 3 is greater than the first distance and smaller than the second distance, that is, the primary 1 and the secondary 2 will mutually compress the permeability magnetic film 3 in the non-working state; while in the working state there is a certain air gap between the primary 1 and the secondary 2 in addition to the permeability magnetic film 3. Since the permeability magnetic film 3 is elastic in the thickness direction, the force generated when the primary 1 and the secondary 2 collide with each other can be effectively absorbed, thereby protecting the primary 1 and the secondary 2 from damage.

The permeability magnetic film 3 includes a permeability magnetic substrate 31 and a non-permeability magnetic substrate 32 that are alternately distributed along a surface of the permeability magnetic film 3. That is, the permeability magnetic film 3 is not a multilayer structure along the thickness direction, but a stripe structure along the surface of the permeability magnetic film 3, in which the permeability magnetic substrate 31 and the non-permeability magnetic substrate 32 are alternately distributed. Compared with the non-permeability magnetic substrate 32, the permeability magnetic substrate 31 is filled with a permeability magnetic film material, so that the permeability magnetic substrate 31 has magnetic permeability. The permeability magnetic substrate 31 covers a magnetic pole of the surface of the primary 1 facing the secondary 2, and the non-permeability magnetic substrate 32 covers a gap between adjacent magnetic poles. The length and width of the permeability magnetic substrate 31 are approximately the same as the length and width of the magnetic pole, and the length and width of the non-permeability magnetic substrate 32 are almost equal to or slightly smaller than the gap between the magnetic poles, that is, the length and width of the slot. The permeability magnetic substrate 31 is filled with the permeability magnetic film material, thus the magnetic permeability thereof is greater than that of the air. The magnetic permeability of the permeability magnetic film 3 may be controlled by controlling the amount of the filled permeability magnetic film material. The magnetic line of force passes through the path of the permeability magnetic substrate 31, which can greatly reduce energy loss. The relationship between the air gap and the suspension force is almost exponential, thus the energy will be saved greatly by reducing the air gap.

A linear motor of a maglev train according to an embodiment of the present disclosure includes a primary 1 and a secondary 2 that are arranged oppositely, and an air gap is provided between the primary 1 and the secondary 2. The air gap has a first distance in a non-working state, and has a second distance in a working state. A permeability magnetic film 3 is provided on a surface of the primary 1 facing the secondary 2, and the permeability magnetic film 3 is elastic in a thickness direction, and a thickness of the permeability magnetic film 3 is greater than the first distance and is smaller than the second distance. The permeability magnetic film 3 includes a permeability magnetic substrate 31 and a non-permeability magnetic substrate 32 that are alternately distributed along a surface of the permeability magnetic film 3, and the permeability magnetic substrate 31 is filled with a permeability magnetic film material. The permeability magnetic substrate 31 covers a magnetic pole of the surface of the primary 1 facing the secondary 2, and the non-permeability magnetic substrate 32 covers a gap between adjacent magnetic poles.

During working, the magnetic pole on the surface of the primary 1 facing the secondary is covered with the permeability magnetic substrate 31, and the gap between the magnetic poles is shielded by the non-permeability magnetic substrate 32. The magnetic field generated by the magnetic poles will be transmitted to the secondary 2 through the permeability magnetic substrate 31 and the air gap in turn. The permeability magnetic substrate 31 has a certain thickness, which can reduce the distance of the air gap, thereby reducing the power consumption of the linear motor, improving the efficiency of the linear motor, and thus improving the driving efficiency of the entire train system. The permeability magnetic film 3 is elastic in the thickness direction, thereby avoiding a direct collision between the primary 1 and the secondary 2 during stopping, and protecting the linear motor from damage.

The specific content of the linear motor of a maglev train according to the present disclosure will be described in detail in the following embodiments.

Figure 4:
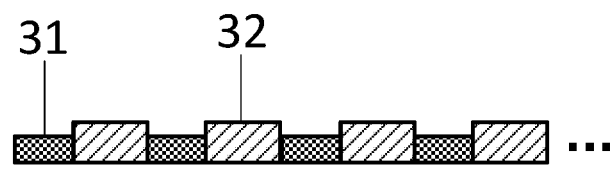
FIG. 4 is a schematic structural diagram of a permeability magnetic film according to an embodiment of the present disclosure.

Reference is made to FIG. 4, which is a schematic structural diagram of a permeability magnetic film according to an embodiment of the present disclosure.

Different from the above-mentioned embodiment of the present disclosure, this embodiment of the present disclosure further introduces a specific structure of the permeability magnetic film 3 in the linear motor of the maglev train of the above-mentioned embodiment, and other contents thereof have been introduced in detail in the above-mentioned embodiments of the present disclosure, which will not be described again herein.

Referring to FIG. 4, in this embodiment, the permeability magnetic film 3 is rigid in a direction parallel to a surface of the permeability magnetic film 3. It should be noted that when the linear motor is powered on, the permeability magnetic film 3 will receive a force along a forwarding direction of the train. To overcome the horizontal force and prevent the permeability magnetic film 3 from deforming in the horizontal direction, the permeability magnetic film 3 is rigid along the surface direction of the permeability magnetic film 3, that is, the permeability magnetic film 3 is rigid in the horizontal direction.

In this embodiment, a surface of the non-permeability magnetic substrate 32 facing the primary 1 is higher than a surface of the permeability magnetic substrate 31 facing the primary 1. When the surface of the non-permeability magnetic substrate 32 facing the primary 1 is higher than the surface of the permeability magnetic substrate 31 facing the primary 1, and the protruded part of the non-permeability magnetic substrate 32 is embedded in the slot on the surface of the primary 1, that is, in the gap between the magnetic poles. When the permeability magnetic film 3 receives a horizontal force, the protruded part of the non-permeability magnetic substrate 32 will apply a certain force on a side wall of the magnetic pole, to ensure that the magnetic film will not slide or deform in the horizontal direction. Generally, the surface of the non-permeability magnetic substrate 32 facing the primary 1 is higher than the surface of the permeability magnetic substrate 31 facing the primary 1 by a height in a range of 1.5 mm to 2.5 mm, including marginal values. That is, compared with the permeability magnetic substrate 31, a height of the protruded part of the non-permeability magnetic substrate 32 facing the primary 1 is usually about 2 mm, to ensure that the magnetic film will not slide or deform in the horizontal direction.

Generally, a thickness of the permeability magnetic substrate 31 ranges from 7 mm to 8 mm, including marginal values. Thus the air gap between the primary 1 and the secondary 2 may be reduced by 7 mm to 8 mm in the working state due to the magnetic film. Assuming that the thickness of the air gap during working is 13 mm, the thickness of the air gap during working will be reduced to 5 mm to 6 mm after setting the permeability magnetic film 3 according to embodiments of the present disclosure, thereby greatly improving the driving efficiency of the entire train system.

In this embodiment, a surface of the non-permeability magnetic substrate 32 facing the secondary 2 has the same height as a surface of the permeability magnetic substrate 31 facing the secondary 2. That is, a surface of the permeability magnetic film 3 facing the secondary 2 is generally a flat surface, such that a pressure force of the secondary 2 against the permeability magnetic film 3 is more uniform.

In this embodiment, the permeability magnetic film material includes a granular iron material or a threadiness iron material. The permeability magnetic substrate 31 of the permeability magnetic film 3 is filled with a magnetic material, usually an iron material. Specifically, to ensure that the magnetic film has elasticity in the thickness direction, the filled iron material is usually a granular iron material or a threadiness iron material.

According to the linear motor of a maglev train provided by the embodiments of the present disclosure, the surface of the non-permeability magnetic substrate 32 facing the primary 1 is higher than the surface of the permeability magnetic substrate 31 facing the primary 1, to ensure that the magnetic film will not slide or deform in the horizontal direction. And the surface of the permeability magnetic film 3 facing the secondary 2 is generally a flat surface, thus the pressure force of the secondary 2 against the permeability magnetic film 3 is more uniform.

A maglev train is provided according to the present disclosure. The maglev train is equipped with the linear motor of a maglev train provided in any of the aforementioned embodiments. Reference may be made to the aforementioned embodiments for details of the linear motor of a maglev train, and for other structures of the maglev train, please refer to the prior art, which will not be described again herein.

In the maglev train provided by the embodiment of the present disclosure, the linear motor of the maglev train has a narrower air gap during working, and the permeability magnetic film 3 is elastic in the thickness direction, thus the driving efficiency of the entire train system can be improved while protecting the linear motor from being damaged.

The embodiments in the present disclosure are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application; such implementation should not be considered to be beyond the scope of the present disclosure.

The steps of the method or algorithm described according to the embodiments disclosed herein can be implemented in forms of hardware, a software module executed by a processor or the combination of the both. The software module may be stored in a Random Access Memory (RAM), a memory, a Read-Only Memory (ROM), an electrically programmable ROM, an electrically erasable programmable ROM, a register, a hardware disk, a movable magnetic disk, CD-ROM or any other forms of storage medium well known in the art.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The linear motor of a maglev train and the maglev train provided by embodiments of the present disclosure are described in detail above. Specific examples are used in the specification to illustrate the principle and implementation of the present disclosure. The description of the above embodiments is only used to help understand the method and core idea of the present disclosure. It should be noted that, for those of ordinary skill in the art, various improvements and modifications may be made to the embodiments of the present disclosure without departing from the principle of the present disclosure, and these improvements and modifications shall be included in the scope defined by the claims of the present disclosure.

The invention claimed is:

1. A linear motor of a maglev train, comprising: a primary and a secondary that are arranged oppositely, wherein an air gap is provided between the primary and the secondary, the air gap has a first distance in a non-working state, and has a second distance in a working state;
   a permeability magnetic film is provided on a surface of the primary facing the secondary, the permeability magnetic film is elastic in a thickness direction, and a thickness of the permeability magnetic film is greater than the first distance and is smaller than the second distance; and
   the permeability magnetic film comprises a permeability magnetic substrate and a non-permeability magnetic substrate that are alternately distributed along a surface of the permeability magnetic film, and the permeability magnetic substrate is filled with a permeability magnetic film material; the permeability magnetic substrate covers a magnetic pole of the surface of the primary facing the secondary, and the non-permeability magnetic substrate covers a gap between adjacent magnetic poles.

2. The linear motor of a maglev train according to claim 1, wherein the permeability magnetic film is rigid in a direction parallel to a surface of the permeability magnetic film.

3. The linear motor of a maglev train according to claim 1, wherein a surface of the non-permeability magnetic substrate facing the primary is higher than a surface of the permeability magnetic substrate facing the primary.

4. The linear motor of a maglev train according to claim 3, wherein a surface of the non-permeability magnetic substrate facing the secondary has the same height as a surface of the permeability magnetic substrate facing the secondary.

5. The linear motor of a maglev train according to claim 4, wherein the surface of the non-permeability magnetic substrate facing the primary is higher than the surface of the permeability magnetic substrate facing the primary by a height in a range of 1.5 mm to 2.5 mm, including marginal values.

6. The linear motor of a maglev train according to claim 5, wherein a thickness of the permeability magnetic substrate ranges from 7 mm to 8 mm, including marginal values.

7. The linear motor of a maglev train according to claim 1, wherein the permeability magnetic film material comprises a granular iron material or a threadiness iron material.

8. A maglev train, comprising a linear motor, the linear motor comprising: a primary and a secondary that are arranged oppositely, wherein an air gap is provided between the primary and the secondary, the air gap has a first distance in a non-working state, and has a second distance in a working state;
a permeability magnetic film is provided on a surface of the primary facing the secondary, the permeability magnetic film is elastic in a thickness direction, and a thickness of the permeability magnetic film is greater than the first distance and is smaller than the second distance; and
the permeability magnetic film comprises a permeability magnetic substrate and a non-permeability magnetic substrate that are alternately distributed along a surface of the permeability magnetic film, and the permeability magnetic substrate is filled with a permeability magnetic film material; the permeability magnetic substrate covers a magnetic pole of the surface of the primary facing the secondary, and the non-permeability magnetic substrate covers a gap between adjacent magnetic poles.

9. The linear motor of a maglev train according to claim 8, wherein the permeability magnetic film is rigid in a direction parallel to a surface of the permeability magnetic film.

10. The linear motor of a maglev train according to claim 8, wherein a surface of the non-permeability magnetic substrate facing the primary is higher than a surface of the permeability magnetic substrate facing the primary.

11. The linear motor of a maglev train according to claim 10, wherein a surface of the non-permeability magnetic substrate facing the secondary has the same height as a surface of the permeability magnetic substrate facing the secondary.

12. The linear motor of a maglev train according to claim 11, wherein the surface of the non-permeability magnetic substrate facing the primary is higher than the surface of the permeability magnetic substrate facing the primary by a height in a range of 1.5 mm to 2.5 mm, including marginal values.

13. The linear motor of a maglev train according to claim 12, wherein a thickness of the permeability magnetic substrate ranges from 7 mm to 8 mm, including marginal values.

14. The linear motor of a maglev train according to claim 8, wherein the permeability magnetic film material comprises a granular iron material or a threadiness iron material.

* * * * *